United States Patent [19]

Mizusawa et al.

[11] 4,367,995
[45] Jan. 11, 1983

[54] QUICK-ACTING EXPANSIBLE FASTENER

[75] Inventors: Akira Mizusawa, Fujisawa; Yoshiaki Notoya, Zushi, both of Japan

[73] Assignee: Nifco Inc., Yokohama, Japan

[21] Appl. No.: 165,401

[22] Filed: Jul. 2, 1980

[30] Foreign Application Priority Data

Jul. 6, 1979 [JP] Japan ................................ 54-85043

[51] Int. Cl.³ .............................................. F16B 13/06
[52] U.S. Cl. ........................................ 411/57; 411/437
[58] Field of Search ...................... 411/57, 60, 44, 15, 411/366, 337, 360, 908, 427, 512, 511; 24/73 PM, 73 PF, 73 P, 217 R

[56] References Cited

U.S. PATENT DOCUMENTS

| 2,393,606 | 1/1946 | Brush | 411/57 |
| 3,182,544 | 5/1965 | Rapata | 411/49 X |
| 3,345,899 | 10/1967 | Fiddler | 411/437 |
| 3,613,497 | 10/1971 | Heldermann | 411/60 |
| 3,918,130 | 11/1975 | Poe | 411/41 X |
| 3,937,122 | 2/1976 | Riedel | 411/34 |

Primary Examiner—Ramon S. Britts
Attorney, Agent, or Firm—Wenderoth, Lind & Ponack

[57] ABSTRACT

A fastening device of synthetic resin includes a male member and a female member. The device is capable of fastening objects by simply axially forcing the male member into the female member whereby external threads of the male member threadably engage with internal threads of the female member. In order to unfasten the device, the male member is rotated in an appropriate direction whereby the male member threadably disengages with the female member causing the male member to axially disengage with the female member.

8 Claims, 11 Drawing Figures

QUICK-ACTING EXPANSIBLE FASTENER

BACKGROUND OF THE INVENTION

This invention relates to a fastening device made of a synthetic resin and comprising a female member provided with a flange, a leg extending outwardly from the flange and having an axially extended hole which is adapted to radially expand upon the insertion of a shank of a male member therein. The hole axially extends along the axis of the leg and the flange. The fastening device also comprises a male member provided with a head portion and a shaft portion extended outwardly from the head portion and adapted to be inserted into the hole or bore of the female member. The fastening device of the present invention is intended to fasten two panels together by passing the leg of the female member through apertures in the two panels, concentrically aligned when the panels are pressed tightly against each other, and then by forcibly driving the shaft portion of the male member into the bore of the female member thereby radially expanding a portion of and allowing the two panels to be squeezed between the expanded portion of the leg and the flange. A specific characteristic of the present invention is the fact that the circumferential surface of the shaft portion of the male member is externally threaded and at least one helical ridge, matched so as to threadably engage with the male member, is formed on the peripheral surface of the bore of the female member, whereby the insertion of the shaft portion of the male member into the bore is accomplished by axially thrusting the shaft portion, and the extraction of the shaft portion from the bore so as to separate the panels is accomplished by rotating the head portion of the male member thereby allowing the male member to be threadably disengaged with the female member.

It has been widely known that fasteners made of synthetic resin are extensively used in fitting together parts in automobiles and in assembling electrical appliances, etc. Among these known fasteners are included fasteners of the kind composed of two members, male and female, and designed to fasten two panels together. The most popular fastener of this kind is known to comprise a female member of synthetic resin provided with a flange, a leg extended outwardly from the inner side of the flange and split lengthwise so as to allow lateral or radial expansion, a hole extending along the axial length of the leg from the outer side of the flange to the longitudinal center of the leg, and a male member made of metal adapted to advance into the hole of the female member and, at the same time, radially expanding the leg. This fastener has a construction such that two panels are fastened together by inserting the leg of the female member through the aperture of one of the panels until the flange comes into contact with the inner side of the panel and then by mounting the other panel on the outer side of the flange and subsequently threading the male member into the hole or bore thereby fastening the latter panel to the outer side of the flange and, at the same time, causing the leg of the female member to expand radially within the aperture of the former panel. This fastener, therefore, entails a work of threading the male member as described above so as to fasten the two panels together.

This threading operation does not necessarily prove easy where numerous kinds of parts are fitted on products during an assembly line process. In an effort to overcome the difficulty, there has been proposed a fastener which uses a round bar-shaped male member of synthetic resin in place of the aforementioned externally threaded male member and which provides the fastening together of two panels by simply driving the male member forcibly into the hole or bore of the female member.

This forced entry type fastener, for the purpose of fastening parts, has advantages over the screw type fastener since it effects the fastening by simply driving the male member forcibly into the bore of the female member. On the other hand, it has a disadvantage that when parts fastened therewith are required to be replaced with new ones, the male member driven forcibly into the hole must be extracted therefrom which involves arduous work. As a solution to this difficulty, there has been proposed a fastener wherein the male member is provided with a portion adapted to project from the outer surface of the flange of the female member when the male member has been driven home fixedly positioned within the bore. When the two members of the fastener are to be separated from each other, the extraction of the male member is accomplished by conveniently axially pulling the projecting portion outward. Depending on the place at which the fastener is used, however, the protrusions of the projecting portion may prove inconvenient. Particularly where parts are fitted in automobiles and electrical appliances, the projecting portion may interfere with the fitting of other parts or impair the appearance of finished products. Also, the use of such fasteners may be impractical for reasons of poor safety.

SUMMARY OF THE INVENTION

In view of the various disadvantages of conventional fasteners of the kind using two members, male and female, the present invention is related to a fastener so designed that the fastening of two panels together is accomplished by simply forcing the male member into the bore of the female member, and the separation of the panels is accomplished by imparting a rotating motion to the male member thereby threadably disengaging it from the female member.

To attain these and other objectives according to the present invention, there is provided a fastener of synthetic resin which comprises a female member provided with a flange, a leg extended outwardly from the inner side of the flange and adapted to be expanded radially, a bore bored longitudinally along the axis of the leg from the outer side of the flange, and at least one guide ridge disposed on the peripheral wall of the bore; a male member provided with a head portion, a shaft portion, extended outwardly from the inner side of the head portion, for insertion into the bore of the female member, and the circumferential surface of the shaft portion is externally threaded so as to threadably engage with the guide ridge of the female member. Two panels are fastened together by inserting the leg of the female member into apertures of the panels and by subsequently forcing the shaft portion of the male member into the bore of the female member while allowing the shaft portion including the external threads to flex and to ride over the at least one guide ridge of the female member, thereby bringing the leg into a radially expanded state and enabling the two panels to be squeezed between the expanded portion of the leg and the flange of the female member. The two panels thus fixed in the fastened state are separated by rotating the head portion of the male member so as to threadably disengage the male member with the female member thereby axially extracting the shaft portion of the male member from the bore of the female member and radially contracting the leg of the female member which enables the female member to be extracted from the apertures of the two panels.

Other objects and features of the present invention will become apparent from the detailed description given hereinafter with reference to the preferred embodiments shown in the accompanying drawings.

DESCRIPTION OF THE PREFERRED EMBODIMENTS

Figure 1:
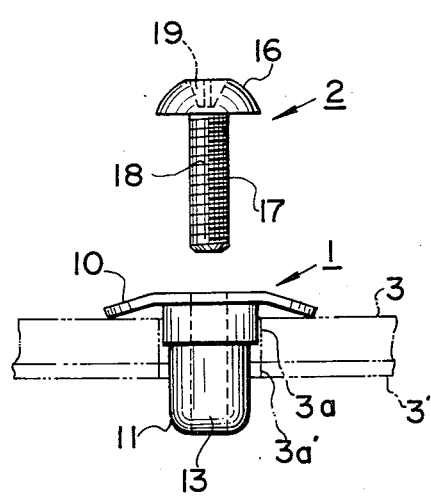
FIG. 1 is a front view of the first embodiment of the fastener according to the present invention.
Figure 2:
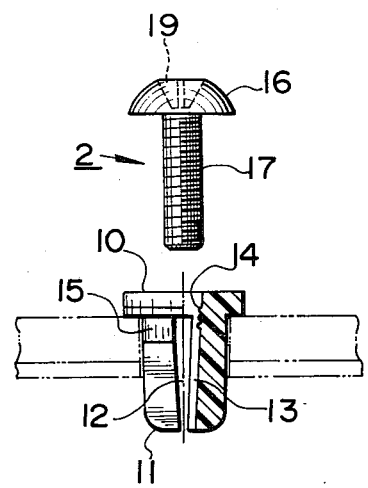
FIG. 2 is a side view of the fastener of FIG. 1 with one portion of the female member shown in cross section.
Figure 3:
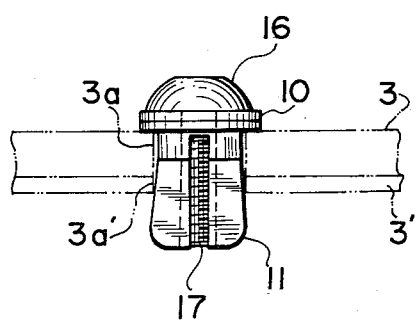
FIG. 3 is a side view of the fastener of FIG. 1 with the members thereof operatively engaged.
Figure 4:
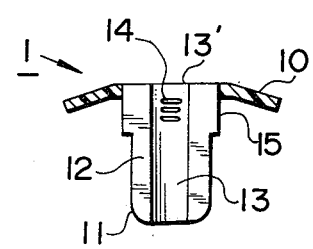
FIG. 4 is a side view of the fastener of FIG. 1 with a portion of the female member shown in cross section.
Figure 5:
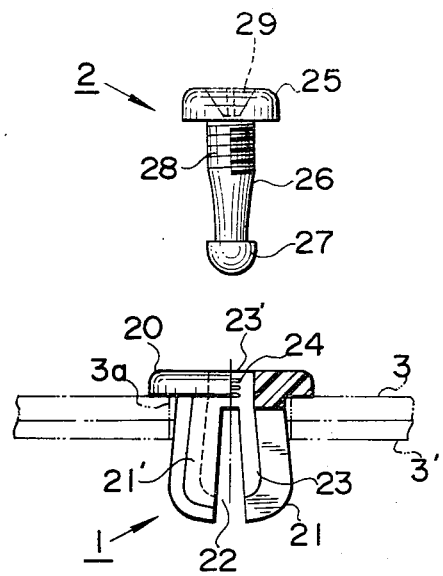
FIG. 5 is a front view of the second embodiment of the fastener according to this invention, with one portion of the female member shown in cross section.
Figure 8:
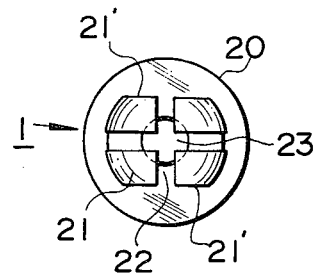
FIG. 8 is a bottom view of the female member of the fastener of FIG. 5.
Figure 6:
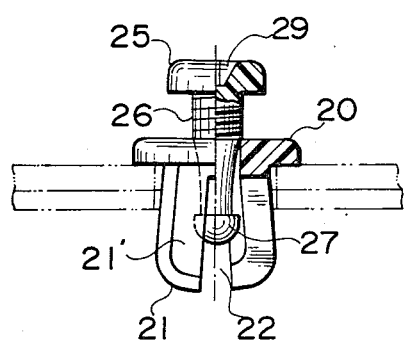
FIG. 6 is a front view of the fastener of FIG. 5 in a semi-fastened state with a portion thereof shown in cross section.
Figure 7:
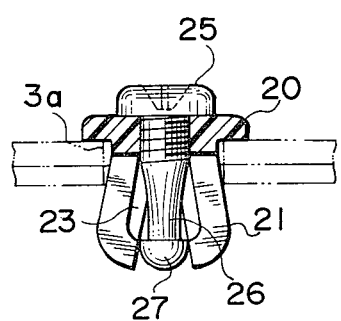
FIG. 7 is a partially sectioned front view of the fastener of FIG. 5 with the members thereof operatively engaged.
Figure 9:
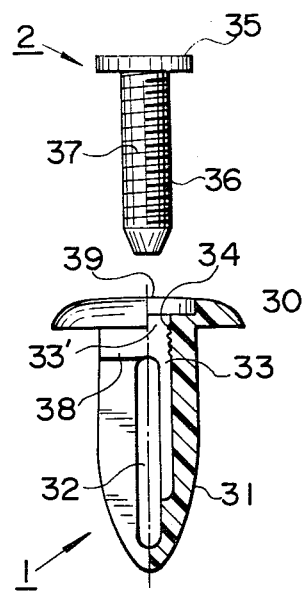
FIG. 9 is a front view of the third embodiment of the fastener according to this invention, with a portion of the female member shown in cross section.
Figure 10:
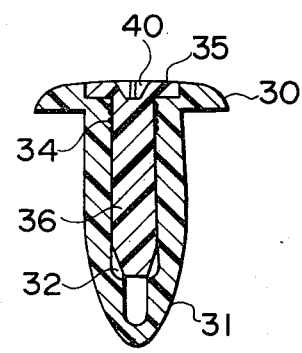
FIG. 10 is a centrally longitudinally sectioned front view of the fastener of FIG. 9 with the members thereof operatively engaged.
Figure 11:
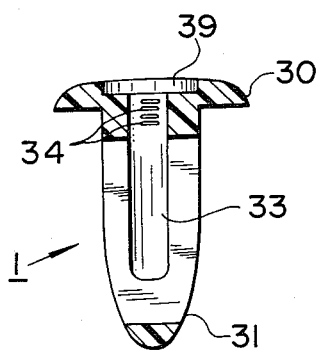
FIG. 11 is a centrally longitudinally sectioned side view of the female member of the fastener of FIG. 9.

FIGS. 1-4 illustrate the first preferred embodiment, FIGS. 5-8 the second preferred embodiment and FIGS. 9-11 the third preferred embodiment respectively of the present invention. Of the numerical symbols which are commonly used in all the drawings, 1 denotes the female member of the fastener of the present invention, 2 the male member which, in cooperation with the female member 1, fastens panels to one other, and 3,3' denote the panels to be fastened with the fastener of the present invention.

In the first preferred embodiment, the female member 1 comprises a body 15, a flange 10 formed in the shape of a rectangular plate extending laterally from the body 15 and a leg 11 extended vertically from the center of one side of the body 15. The leg is divided into two opposed prongs by a longitudinally extending slit or groove 12 extending longitudinally in the axial direction of the leg. By virtue of this slit, the leg is able to contract radially or, conversely to be expanded radially outwardly when an outward radial force is exerted therein. At the center of the plate-shaped flange 10 is disposed a hole or bore 13 which pierces the body 15 from the upper side and extends through the lower side of the body 15 and further extends downwardly along the center longitudinal axis of the leg 11 and terminates at the lower end of the leg. On the peripheral surface of the bore near an upper opening 13' thereof, a plurality of spiral ridges 14 are formed. On the outer surface of the body 15 at the portion thereof adjacent the bore 13, there is formed a seat 15a of a rectangular cross section conforming to the shape of the apertures 3a,3a' formed in the panels 3,3' to be described fully hereinafter.

Further, the male member 2 which cooperates with the female member 1 comprises a head portion 16 and a shaft portion 17 extending vertically from one side of the head portion. The circumferential surface of the shaft portion 17 is threaded along the entire length of the shaft portion. On the other side of the head portion 16, a laterally extending engaging groove 19 is formed, therein for engaging with the tip of a screw driver. Thus, the male member is generally shaped like a bolt. The shaft portion 17 of the male member is formed so that the outside diameter thereof is substantially the same as the diameter of the bore 13 of the female member and the length thereof allows the shaft portion to reach the lower end of the leg 11 when the shaft member is forced into the bore 13 as described fully hereinafter.

The female member 1 and the male member 2 constructed respectively as described above are separately molded of a thermoplastic synthetic resin such as, for example, nylon which suitably combine rigidity and flexibility. They are used respectively as indicated below.

The fastener of the present preferred embodiment constructed as described above is intended for use in fastening two panels 3,3' into a face-to-face fixed union. The apertures 3a,3a' in the panels have a rectangular cross-sectional shape suitable for fittingly engaging with the seat 15a formed on the outer periphery of the female member. Prior to the union of the panels, the panels are brought into face-to-face contact with each other and are adjusted in their relative position so that their respective apertures concentrically align with each other. The leg 11 of the female member 1 is inserted through the aligned apertures until the flange engages with an outer surface of the upper panel 3 and, at the same time, the seat 15a seats with the periphery of the aperture 3a. If the leg 11 has a diameter slightly greater than the diameter of the bore, the insertion of the leg therein is nonetheless possible since the leg is allowed to contract radially by virtue of the slit or groove 12.

After the insertion of the leg 11 into the apertures 3,3a as described above, the shaft portion 17 of the male member 2 is inserted into the bore 13, thereby initially piercing the body 15 axially inwardly, before the shaft portion 17 is subsequently forced completely into the bore 13 by an inward axial force being exerted on the head portion 16 of the male member. Upon entering the bore 13, the shaft portion causes the leg 11, which has been contracted radially so as to fit within the bores 3a,3a', to be outwardly expanded along the axial length thereof remote from the panels 3,3'. Thus, the fastening together of the two panels is completed. With regard to the insertion of the male member into the leg 11, the male member 2 is subject to a resistance reaction exerted by the ridges 14 formed on the peripheral surface of the bore 13 because the diameter of the shaft portion 17 is substantially the same as the diameter of the bore 13. However, since the female member and the male member are both made of flexible synthetic resin as described above, the ridges 14 deform and the threads 18 of the shaft portion 17 deform so as to allow a forced insertion of the shaft portion into the bore 13. When the forced insertion is completed, the deformed components resume their original shapes, resulting in the ridges 14 threadably engaging the corresponding threads 18.

As described above, the fastener can accomplish the fastening of the panels together by the simple method of inserting the leg 11 of the female member into the apertures 3a,3a' and subsequently forcing the shaft portion 17 of the male member into the bore 13 of the female member. When the panels are to be subsequently separated, since the ridges 14 on the inner wall surface of the insertion hole are threadably engaged with the threads 18 of the shaft portion 17, an appropriate rotation of a screw driver, whose tip is inserted in the engaging groove 19 formed in the head portion of the male member, enables the shaft portion 14 to be easily threaded out of the bore 13. Consequently, the leg expanded radially within the apertures of the panels is subsequently contracted in the radial direction thus permitting the panels to be separated. During the threaded disengagement of the male member with the female member, the male member never entrains the female member therewith because the seat 15 of the female member is fixedly seated within the aperture 3a and is thus prevented from rotating about its axis.

The second preferred embodiment of the invention will be described with reference to FIGS. 5–8. The female member 1 has the leg 21 extended vertically from the one side of the body 20a from which flange 20 extends laterally and the leg 21 is divided into four prongs by a cross slit or groove 22 extending axially along the leg from the lower end thereof in the longitudinal direction, and the hole or bore 23 is bored downwardly from the outer surface of the body 20a and axially extends along the leg. The bore 23 is formed so that the diameter thereof is greater at the middle portion of the leg than at the upper opening 23', and, along the periphery wall of the hole 23 in body 20a close to the opening 23', a plurality of spiral ridges 24 are formed. To correspond to the aforementioned variable diameter of the bore 23, the outside diameter of the leg 21 in its normal state is likewise greater at the longitudinal middle portion thereof than at the base portion thereof adjacent the flange. Further, the outer periphery of the part of the body 20a beneath the flange and of the leg is shaped so as to form flat surfaces 21',21' throughout the entire axial length of this part of the body and of the leg.

With regard to the male member 2, the shaft 26, which is extended outwardly from the inner side of the head portion 25, has a diameter which decreases from the axial middle to the free end thereof and the free end is a semispherically enlarged portion 27. The circumferential surface of the half portion of the shaft adjacent the head, is threaded. Also the shaft 26 has an axial length slightly greater than the axial length of the bore 23 of the female member so that the enlarged portion 27 at the free end thereof projects from the bore and wedges between the inner surfaces of the slit 22 at the free end of the leg 21 when the shaft portion is inserted into the bore. The threaded portion of the shaft 26 has a diameter substantially equal to the diameter of the bore 23 at the upper opening 23' thereof.

The fastener in the present preferred embodiment is used in much the same manner as that of the first preferred embodiment, with the exception that the male member can be firstly partially inserted into the female member so that the enlarged portion 27 of the shaft is axially positioned adjacent the enlarged diametrical portion of the bore 23 of the leg 21 before the female member is inserted into the apertures 3a,3a' of the panels 3,3'.

The fastening together of the panels is accomplished by inserting the leg of the female member through the apertures of the panels and subsequently forcing the shaft 26 completely into the bore 23 by exerting an appropriate axial force on the head portion 25 of the male member.

During the forced insertion, the threaded portion 28 of the shaft 26 flexes over the ridges 24 of the peripheral surface of the bore so as to permit the entry of the shaft 26 completely into the bore and, at the same time, the enlarged portion 27 of the shaft penetrates the bottom of the bore and wedges between the inner surfaces of the slit 22, resulting in the split legs 21 being radially expanded. Thus, the panels are fastened together by being fixedly positioned between the expanded portion of leg 21 and the flange 20.

The separation of the panels is accomplished by fitting a screw driver into the engaging groove 29 formed in the head portion 25 and by rotating the male member in the suitable direction thereby threadably disengaging the male member from the female member and thus relieving the leg 21 of its radial expansion and releasing the leg from the apertures 3a,3a'. Of course, in the fastener of the present preferred embodiment, the disengagement of the male from the female member is attained by continuing the rotation of the screw driver until the swelled portion 27 is released from the slit or groove 22 and subsequently pulling out the shaft of the male member.

The preferred embodiments described above have involved constructions wherein the female member 1 and the male member 2 are molded separately with respect to each other. Optionally, the fastener may be molded integrally with the lower end of the shaft of the male member 2 having a thin-walled portion which engages the upper periphery of the bore 13 of the female member. With this integrally molded fastener, the fastening of two panels to each other is accomplished by inserting the leg of the female member through the apertures in the panels, striking with a wooden hammer or the like the head of the male member thereby severing engagement of the thin-walled portion with the female member as described above and, at the same time, forcing the shaft portion of the male member into the bore.

The third preferred embodiment illustrated in FIGS. 9–11 represents a modification wherein free end of the leg 31 of the female member 1 is conically shaped. This leg is provided with a bore 33 bored axially inwardly from the upper or outward side of the body 30a having the laterally extending flange 30. Further two diametrically opposing grooves 32 are formed in the circumferential wall of the leg 31, and the grooves 32 longitudinally extend along the axial length of the leg 31.

The leg 31 has a radially thickened peripheral wall near the longitudinal middle portion thereof. The bore 33 has a uniform diameter substantially throughout the entire length thereof so as to admit, in a tightly fitted manner the shaft 36 of the male member 2 having a diameter substantially equalling the diameter of the bore. The circomferential surface of the shaft 36 of the male member is externally threaded. The peripheral wall of the bore 33 in the body 30a near opening thereof for admitting the shaft is internally threaded 34 so as to correspond with the threads 37 of the shaft 36. Further on the upper or outward side of the body 30a of the female member 1, the opening 33' for the bore radially enlarged so as to form an annular recess 39 which functions to receive and retain the head portion 35 of the male member. The body 30a is provided at the base portion thereof with a seat 38 having a lateral cross section configuration conforming to the peripheral shape of the apertures of the panels.

As described above with respect to the foregoing preferred embodiments, the fastener of the present preferred embodiment accomplishes the fastening together of two panels by first inserting the leg 31 of the female member through the apertures in the panels until the flange 30 comes into contact with the surface of the adjacent panel (with the panels not illustrated in the present embodiment) and subsequently forcing the shaft or shaft portion 36 of the male member into the bore 33 of the female member. In the present preferred embodiment, the female member is adapted so that during the insertion of the leg 31 through the apertures, the above-described radially thickened peripheral wall portion of the leg with advances into the apertures by being contracted radially inward by virtue of the above-described slits or grooves, and, after being projected through the panels, the leg resumes its normal radially expanded state by virtue of the resiliency of the material thereof. The fastener fastens the panels together when the female member is prevented from radial contraction due to the subsequent forced insertion of the shaft portion 36 of the male member into the bore 33. In consequence of this forced insertion, the male member has its head portion 35 seated in the annular recess 39, with the result that the upper or outer surface of the head portion falls flush with the upper or outer surface of the body 50a and the flange 30. Naturally, during the forced insertion of the shaft portion, the threads 37 of the shaft portion inwardly axially advance by riding over the ridges or internal threads 34 formed on the inside periphery of the bore and, on completion of this forced insertion, the male and female members are threadably engaged. The separation of the panels is accomplished by fitting the tip of a screw driver in the engaging groove 40 formed on the head portion 35 and rotating the screw driver thereby causing the shaft portion to threadably disengage with the inner periphery of the bore.

The fastening device of the present invention has been described in detail above with reference to various preferred embodiments. In the actual use of the fastening device of the present invention, the fastening together of two panels is accomplished by inserting the leg of the female member through the concentric apertures of the panels and subsequently forcing the shaft portion of the male member into the bore of the female member, and the subsequent separation of the panels is attained by rotating the male member in the suitable direction with a suitable tool such as a screw driver and thereby threadably disengaging the male member from the peripheral wall of the bore as described above. Since the above-described operations are easy to perform, the fastening device of the present invention is highly practical. The fastener of the present invention has another advantage that since the head portion of the male member, upon the forced insertion, is brought into tight contact with the upper or outer surface of the flange of the female member and the flange is countersunk, the head and a smooth flange have flush surfaces, and thus the fastener assumes an appearance resembling a rivet. Also, the fastener protrudes only slightly from the panel surface and, therefore, offers no interference with the function of the panel. Further, the fastener functions advantageously in the fastening of machine parts of the kind subject to vibration because the male member is not likely to be loosened from the female member unless the male member is intentionally threadably disengaged therefrom.

In the various preferred embodiments described above, the ridges provided on the peripheral wall surface of the bore are internal threads. The principal functions that these ridges fulfill are that they engage the thread on the incoming shaft portion and, that during the extraction of the shaft portion, they threadably guide the shaft portion from the female member. For these functions, just one continuous ridge or internal thread or a series of short curvilinear ridges or threads circumferentially spaced will suffice. Instead of having a plurality of ridges diametrically disposed on the peripheral wall of the bore as involved in the preceding preferred embodiments, one continuous circumferential ridge may be formed on the peripheral wall surface. It is further permissible to have a continuous ridge spirally formed on the peripheral wall surface of the bore of the female member and a plurality of ridges formed on the circumferential surface of the shaft portion of the male member or, conversely, to have a plurality of ridges formed on the inner wall surface of the hole of the female member and a continuous ridge spirally formed on the circumferential surface of the male member. In the case of such modifications as described above, after the male member has been forced into the female member so as to fasten the panels to each other, the extraction of the shaft portion can be accomplished by rotating the head portion of the shaft portion in the appropriate direction thereby causing the shaft portion to threadably disengage with and move axially outwardly from the female member. Although the number and circumferential length of the ridges or threads are not specifically limited as described above, the ridges must fulfill the requirement that, during the forced insertion of the male member, they must flex thereby providing no hindrance to the straight axial inward advance of the shaft portion into the female member and, upon completion of the forced insertion, the ridges should threadably engage with the threads formed on the outer circumferential surface of the shaft portion. For this reason, the individual ridges are required to have an appropriate radial length with respect to the flexibility and elasticity of the material used therefor.

The foregoing preferred embodiments have been described with a regard to the disposition of ridges particularly on the peripheral wall of the bore adjacent to the opening of the bore in the body. The reason for this location is that, at this particular position, the peripheral wall of the bore maintains substantial radial stability and that this portion of the peripheral wall is in constant contact with the shaft portion of the male member during the insertion of the shaft portion. In this sense, it is most ideal for the ridges to be disposed in the portion of the peripheral wall of the bore which corresponds to the body.

In summary, it is essential for the proper functioning of the present invention for the ridges to be formed on the peripheral wall of the bore and for these ridges to threadably engage with the threads formed on the shaft portion after the forced insertion of the shaft portion into the female member. Moreover, during the forced insertion, the ridges and the shaft threads are deformed by virtue of the flexibility and elasticity of the material thereof so as to allow the axial advancement of the shaft portion, and, upon completion of this forced insertion, the shaft threads and the ridges are allowed to resume their original shapes and consequently are brought into threaded engagement and, during the rotation of the male member relative to the hole, the ridges and the threaded shaft portion threadably disengage thereby allowing the extraction of the male member from the female member. It follows that the respective shapes of the leg, the flange of the female member, the head portion and the shaft portion of the male member may be specifically designed so as to suit the purpose for which the fastener is to be used. Although the invention has been so far described with respect to its application for the fastening of two panels together, it may also be utilized practically for example for the purpose of fastening parts to panels or attaching fixtures to panels. Further, as is clear from the description given above, the use of the fastener of the present invention is not necessarily limited to the case where the objects to be fastened are joined face to face.

What is claimed is:

1. A fastening device for fastening two objects together each respectively having an aperture therethrough, the apertures being concentrically aligned, said device comprising:

a female member of a flexible synthetic resin and having a body at one end thereof with a flange extending laterally therefrom and a leg, said leg being connected to one side of said body and having a free end longitudinally outwardly extending therefrom for being fitted into the apertures whereby said flange abuts one of the objects;

said female member having a bore therethrough longitudinally extending through said body and said leg;

said leg having at least one elongated groove through the peripheral wall thereof and longitudinally extending in the longitudinal direction of said leg and the peripheral wall of said bore in said body having at least one radially inwardly extending circumferentially discontinuous ridge integral with and of the same material as said body and having portions in diametrically opposite surfaces of said bore, and the inner surface of said bore in said leg being entirely smooth, for, when a shank having a larger diameter than said bore is inserted therein, having said ridge flex in the longitudinal direction of said bore and having said leg free end radially expand thereby securing the shank within said bore;

a male member made of a synthetic resin and having a head and a shank, said shank being connected to a first side of said head and having a free end longitudinally outwardly extending therefrom for, when an axial force is exerted on said head, being axially thrust into said bore and radially expanding said leg free end and for having said head first side abut said flange thereby fastening the two objects together between said flange one end and said leg free end; and the circumferential surface of said shank having threads integral with and the same material as the shank for, when said shank is axially thrust into said bore, flexing in the longitudinal direction of said bore and, when said shank is secured within said bore and said head abuts said body and said flange, having said threads threadably engaging with said at least one ridge for, when said male member is rotated in one direction, threadably disengaging said male member from said female member thereby axially removing said shank from said bore.

2. A fastening device as claimed in claim 1, wherein said at least one ridge is helical.

3. A fastening device as claimed in claim 1, wherein said fastening device has a frangible portion integrally connecting said male member with said female member for fixedly aligning said leg with said bore for, when an axial force is exerted on said head, allowing said leg to be thrust directly into said bore and thereby severing said frangible portion.

4. A fastening device as claimed in claim 1, wherein said head has a laterally extending groove therein for inserting a tool therein for rotating said male member in said one direction.

5. A fastening device as claimed in claim 1, wherein said leg has two diametrically opposed elongated grooves.

6. A fastening device as claimed in claim 1, wherein said leg has four elongated grooves circumferentially spaced from one another.

7. A fastening device as claimed in claims 1 or 2, wherein said female member has two said ridges longitudinally spaced from one another.

8. A fastening device as claimed in claim 1, wherein said body has an annular recess therein for, when said head abuts said body, accommodating said head therein and thereby allowing the outwardly facing adjacent surfaces of said body and flange and said head to be flush with one another.

* * * * *